US007761251B2

(12) United States Patent
Bauerle

(10) Patent No.: US 7,761,251 B2
(45) Date of Patent: Jul. 20, 2010

(54) SYSTEMS AND METHOD FOR IMPROVING ACCURACY OF SENSOR SIGNALS RECEIVED VIA SENT PROTOCOL

(75) Inventor: Paul A. Bauerle, Fenton, MI (US)

(73) Assignee: GM Global Technology Operations, Inc.

( * ) Notice: Subject to any disclaimer, the term of this patent is extended or adjusted under 35 U.S.C. 154(b) by 111 days.

(21) Appl. No.: 12/053,049

(22) Filed: Mar. 21, 2008

(65) Prior Publication Data

US 2008/0312860 A1 Dec. 18, 2008

Related U.S. Application Data

(60) Provisional application No. 60/934,984, filed on Jun. 15, 2007.

(51) Int. Cl.
*G01D 18/00* (2006.01)

(52) U.S. Cl. .......................................................... 702/89

(58) Field of Classification Search ................. 702/183, 702/89; 324/225
See application file for complete search history.

(56) References Cited

U.S. PATENT DOCUMENTS 6,486,661 B2 * 11/2002 Chia et al. .................. 324/225

OTHER PUBLICATIONS

SAE International, SAE J2716, Surface Vehicle Information Report, “SENT—Single Edge Nibble Transmission for Automotive Applications”, Copyright 2005 SAE International, Date Published: Feb. 2008, pp. 1-15.

SAE International, Appendix to SAE J2716 Information Report, pp. 1-3.

* cited by examiner

*Primary Examiner*—Tung S Lau
*Assistant Examiner*—Xiuquin Sun

(57) ABSTRACT

A sensing system comprises a sensor that generates a calibration pulse and first sensor data and that transmits the first sensor data using a variable pulse width. A control module determines an age of the first sensor data based on a time difference between the calibration pulse and when the sensor data is at least one of received and used, that determines a rate of change of the sensor data based on N prior sensor data samples and the first sensor data samples, and that adjusts the first sensor data based on the time difference and the rate of change.

12 Claims, 5 Drawing Sheets

SYSTEMS AND METHOD FOR IMPROVING ACCURACY OF SENSOR SIGNALS RECEIVED VIA SENT PROTOCOL

CROSS-REFERENCE TO RELATED APPLICATIONS

This application claims the benefit of U.S. Provisional Application No. 60/934,984, filed on Jun. 15, 2007. The disclosure of the above application is incorporated herein by reference in its entirety.

FIELD

The present disclosure relates to systems and methods for improving accuracy of sensor signals.

BACKGROUND

The statements in this section merely provide background information related to the present disclosure and may not constitute prior art.

Analog sensors are often used in control systems to sense various parameters of a system. For example, vehicle systems monitor parameters such as but not limited to exhaust temperature, throttle position, fluid or air pressures, etc. Signals generated by these analog sensors are typically output to an analog to digital (A/D) converter, which converts the analog signal to a digital value. The A/D converters typically have a predetermined latency between the sensor output and the corresponding digital representation.

Recently developed protocols such as Single Edge Nibble Transmission (SENT) protocol (for example as described in S.A.E. J2716, which is hereby incorporated by reference in its entirety) have been proposed for use in vehicles. In these systems, digital sensors output a calibration pulse and a sensor signal. The sensor signal is a variable pulse width digital signal, which includes a series of pulses with data measured as falling edge to falling edge times. As a result, the amount of time required to transmit the sensor signal depends upon the actual sensor value that is measured. In addition to this variable latency, additional variable latency may occur due to processing delays.

For example, some vehicles sample throttle position every T ms for electronic throttle control (ETC) purposes. There is a variable time delay from the time that the sensors are read until the T ms loop starts in the central processing unit (CPU) or engine control module (ECM). The last complete sample is obtained from the interface when the CPU or ECM makes a request. As a result, there can be a variable delay in reporting of the throttle position to the application software in the CPU or ECM from the time that the sensors are actually read. It may take a first delay period between complete transmissions from the sensor to the CPU or ECM via the SENT protocol. While the application is reading the hardware interface, another sampling may be in progress, which may add a second delay period. The delay will be variable because the data is transmitted to the CPU or ECM asynchronous to any time-based or event-based software loops.

SUMMARY

A sensing system comprises a sensor that generates a calibration pulse and first sensor data and that transmits the first sensor data using a variable pulse width. A control module determines an age of the first sensor data based on a time difference between the calibration pulse and when the sensor data is requested, that determines a rate of change of the sensor data based on N prior sensor data samples and the first sensor data samples, and that adjusts the first sensor data based on the time difference and the rate of change.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1A:
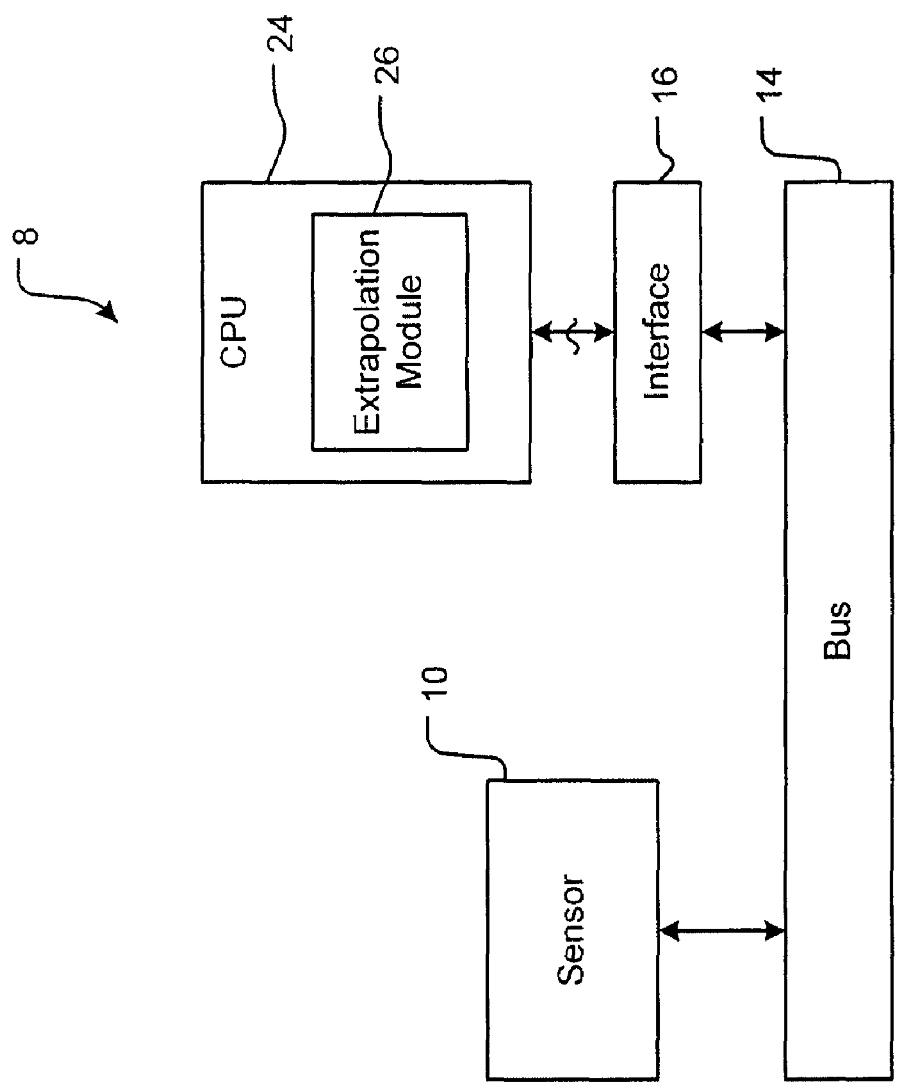
FIG. 1A is a functional block diagram of a sensing system according to the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure describes a system and method that may be implemented in a hardware interface, a CPU and/or ECM to compensate for the variable latency. For example only in vehicle applications, the data may be generated by vehicle sensors such as but not limited to a throttle position sensor (TPS), a mass airflow (MAF) sensor or other sensors. While throttle position in a vehicle is described herein, skilled artisans will appreciate that any other sensors may be used and/or an environment other than a vehicle may be used.

The sensor generates a calibration pulse and sensor data. The system and method generate a timestamp at a start of the calibration pulse and a timestamp of the current time that the CPU or ECM requests the sensor data. The time difference is used to extrapolate the sensor data so that the sensor data more accurately represents the actual sensor value (such as throttle position) when the CPU or ECM actually uses the data.

For example, N prior values of the sensor data can be used to establish a rate of change, where N is an integer greater than zero. The time difference and the rate of change can be used to estimate the new value. For example, interpolation such as linear interpolation can be used.

As a result, the sensors are read approximately "real time" so existing control systems can use the data for feedback without stability problems caused by variable latency in the data received over a communication link such as a SENT digital communication link.

Referring now to FIG. 1A, a sensing system 8 according to the present disclosure is shown. A sensor 10 generates the calibration pulse and a sensor data signal that is output to a bus 14. The sensor 10 may include a digital sensor that generates pulse width modulation signals. An interface 16 communicates with the bus 14. A central processing unit 24 comprises an extrapolation module 26. As can be appreciated, the interface 16 can be integrated with the CPU 24 if desired. For example only, the CPU may be an ECM.

In use, the sensor 10 generates the calibration pulse and digital sensor data that is output to the bus 14. The sensor 10 may initially transmit the calibration pulse to the interface 16 or the CPU 24. The sensor 10 sends the digital sensor data via the bus 14 using variable pulse widths. For example, the sensor 10 may be compliant with the SENT protocol. Variable latency may be caused by variations in the value of the data and by differences in when the CPU needs the data.

The CPU 24, the extrapolation module 26, and/or the interface 16 receives the sensor data and generates an age of the data based on a difference between the time that the calibration pulse is received and the time that the sensor data is being requested or used by the CPU 24. The CPU 24 or the extrapolation module 26 generates a rate of change based on N prior values of the sensor data and the current sensor data, where N is an integer greater than zero. The rate is then applied to the difference to generate more time-accurate sensor data.

Figure 1B:
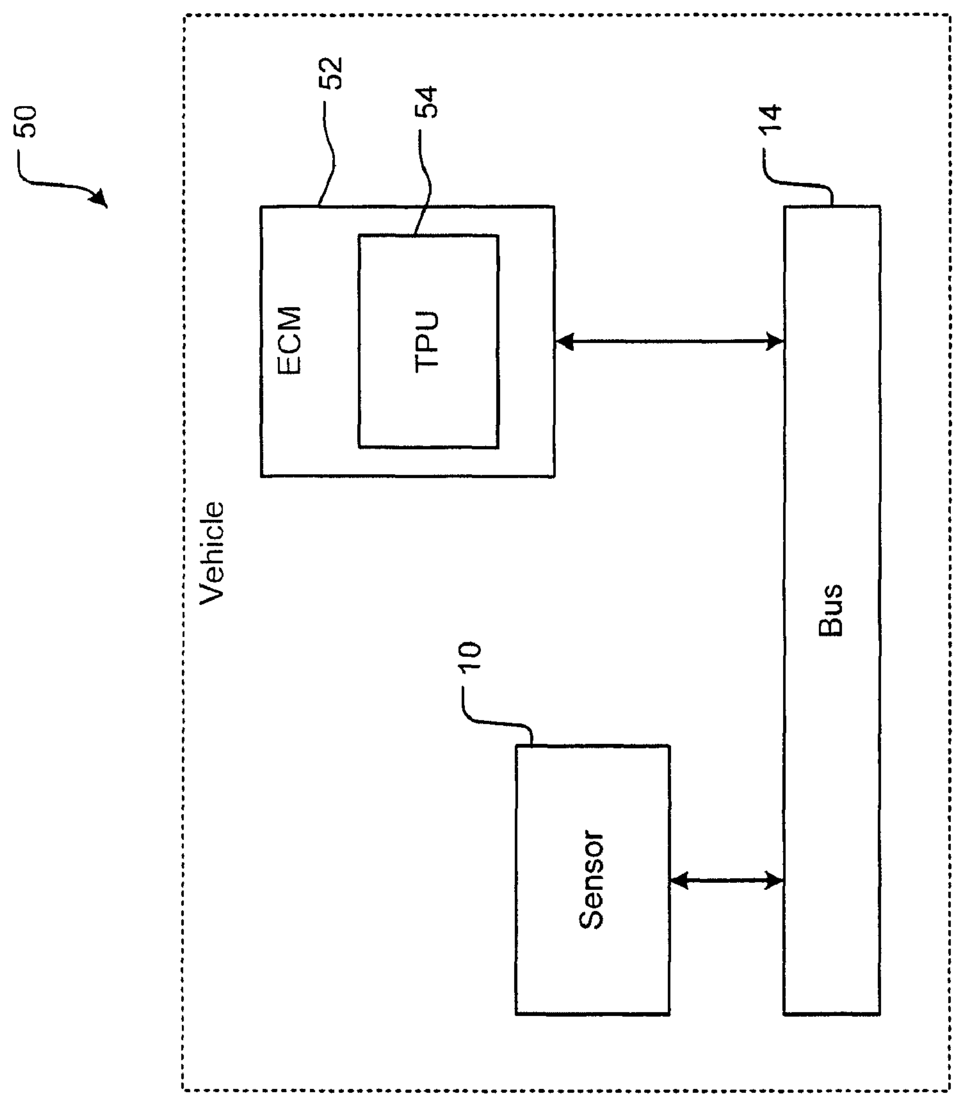
FIG. 1B is a functional block diagram of vehicle comprising a sensing system according to the present disclosure.

Referring now to FIG. 1B, a vehicle 50 comprises an engine control module 52 with a throttle position unit (TPU) 54. The ECM 52 and TPU 54 perform compensation as described herein.

Figure 2A:
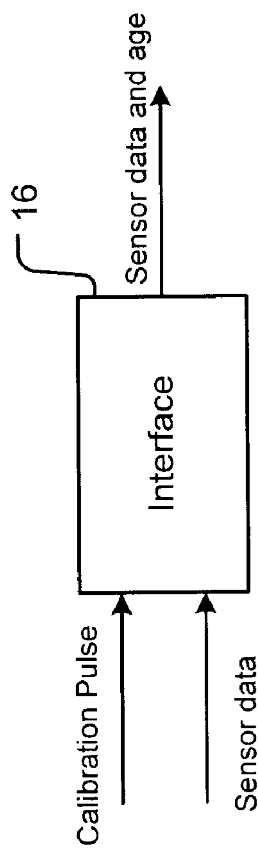
FIG. 2A is a signal diagram of inputs to the interface of FIG. 1.
Figure 2B:
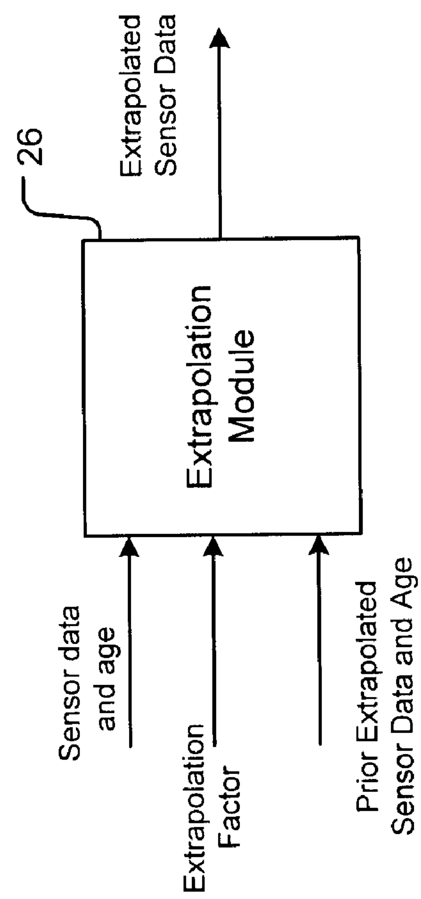
FIG. 2B is a signal diagram of an extrapolating module associated with the CPU of FIG. 1.

Referring now to FIGS. 2A and 2B, exemplary inputs to the interface 16 and the extrapolation module 26 associated with the CPU 24 of FIG. 1 are shown, respectively. In this exemplary implementation, the interface 16 calculates the age of the sensor data and reports how much time has elapsed from when the message was received (per the start of calibration pulse time-stamp) until it was reported to the CPU 24.

The CPU 24 may request a sensor sample again before a new sample has been received. If no new valid sample has been received, then the same sensor data may be reported again. However, the age of the sensor data may be updated to show that the sensor data is now older.

The interface 16, the CPU 24, and/or the extrapolation module 26 can calculate the extrapolated or compensated sensor data. The CPU 24 and/or the extrapolation module 26 may use the age value and apply time-based compensation depending on an extrapolation factor (such as a value between 0 and 1). For example only, suitable equations (excluding initialization, errors and fault/enable conditions):

```
IF (Loop_Rate + Last_Age - Current_Age) >= Calibration # Protects
for Divide by zero if no new sensor data since last loop
  THEN
    Sensor_Rate = (Sensor_Data - Sensor_Data_old) / (Loop_Rate +
Last_Age - Current_Age)
    Sensor_Data_old = Sensor_Data
  ENDIF
    Last_Age = Current_Age
    Extrapolated_Sensor_Data = Sensor_Rate * Extrapolation_Factor *
Current_Age + Sensor_Data
```

Figure 3:
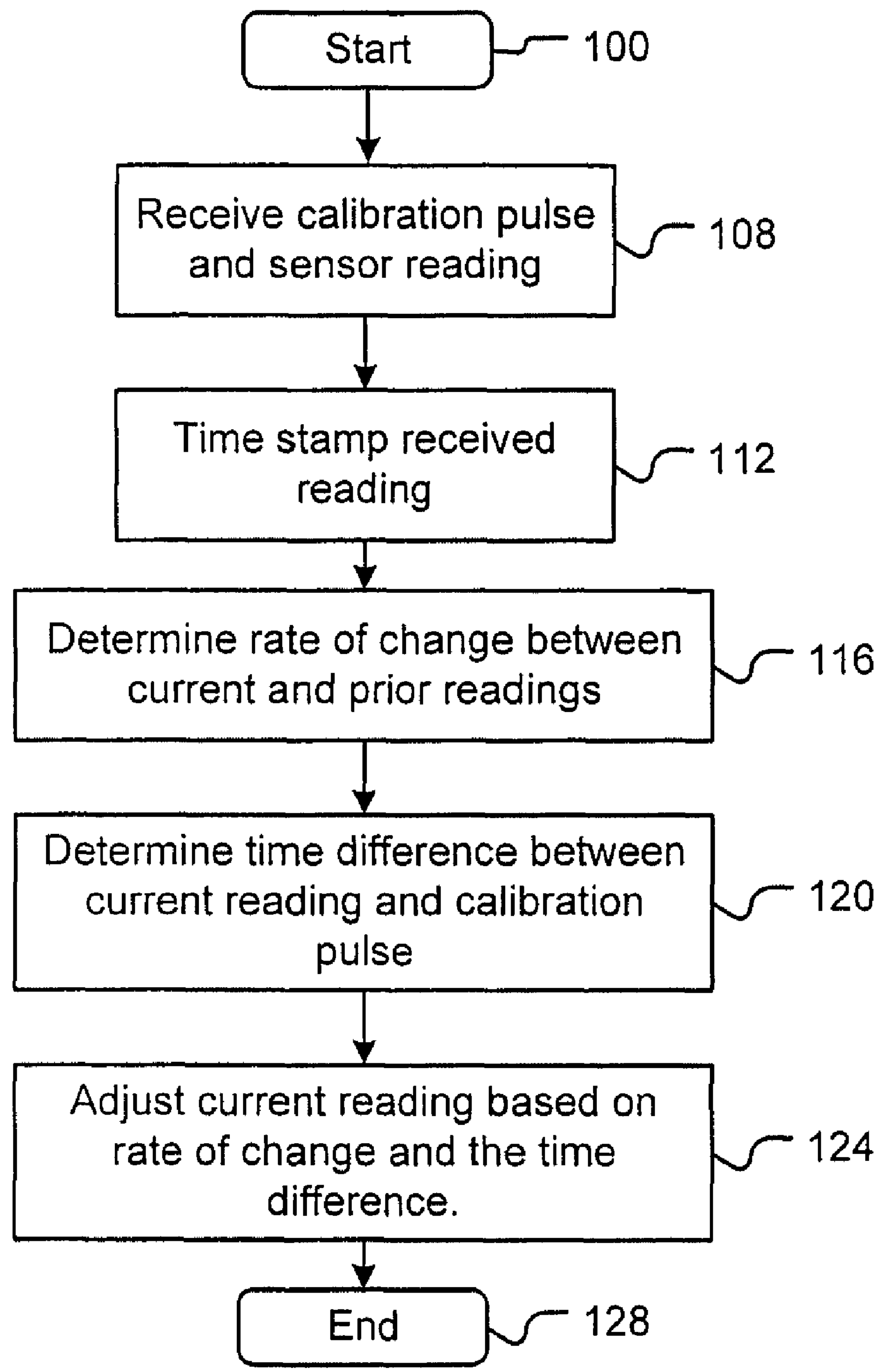
FIG. 3 illustrates steps of a method for extrapolating sensor data in a system having variable latency.

Referring now to FIG. 3, a method for extrapolating sensor data in a system having variable latency is shown. Control begins with step 100. In step 108, the sensor generates a calibration pulse. Also in step 108, the sensor generates sensor data and transmits the data via the bus. In step 112, the interface reads the sensor data and generates a time stamp when received. Alternately, the interface generates an age for the sensor data and forwards the data to the CPU. The CPU and/or extrapolation module also determines a rate of change between the current sensor reading and one or more prior sensor readings in step 116. The CPU and/or extrapolation module determines the time difference between the calibration pulse and the time stamp in step 120. In step 124, the CPU and/or extrapolation module adjusts the current reading based on the rate of change and the difference. An extrapolation factor may be used to provide a variable adjustment if desired as described above. Control ends or returns in step 128.

As can be appreciated, the system and method may be used in a vehicle system with the SENT protocol. A TPU associated with the ECM can pre-process the SENT data received and make available to the CPU data representing the values of the sensor readings for the latest complete SENT and the previously completed SENT message. Also, the TPU may time-stamp the two sets of sensor data from the two latest received SENT messages.

In another implementation, the previously described approach is used. However, when the sensor data is read from the TPU, the TPU may return the delta time from the time of the request until the time of the receipt of the message for one time stamp, and the delta time between the receipt of the last two SENT messages.

In either approach, the ECM and/or TPU may use this data to extrapolate what the current values or positions of the sensors are at the time of the request to the TPU. This approach evaluates the delta change in the sensor value divided by the delta time between the two. The delta time between reading the TPU and the latest message multiplied by the slope may be added to the latest sensor readings to provide a compensated sensor reading that tends to be more immune to the variable latency of the TPU data.

A 0 to 1 calibration factor may be input to the TPU or used in the ECM to define how much extrapolation would be desired. Zero may correspond to no extrapolation and 1 may correspond to full linear extrapolation.

Figure 4:
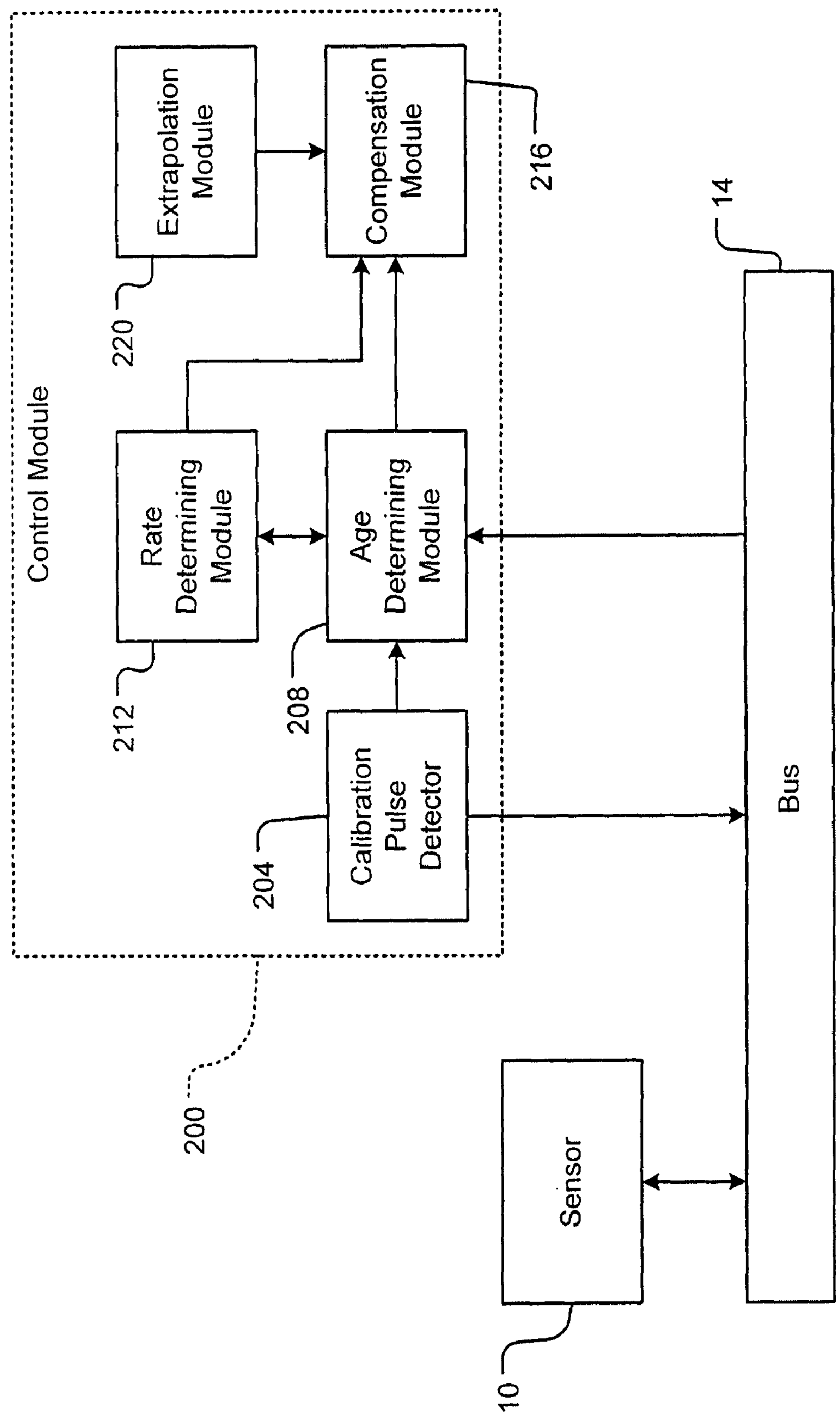
FIG. 4 is a functional block diagram of another exemplary control module.

Referring now to FIG. 4, an alternate exemplary control module 200 is shown. The control module 200 includes a calibration pulse detector 204 that detects the calibration pulse transmitted by the sensor as described above. The control module 200 includes an age determining module 208 that determines an age of first sensor data based on a time difference between the calibration pulse and when the sensor data is at least one of received and used. A rate determining module 212 determines a rate of change of the sensor data based on N prior sensor data samples and the first sensor data samples. A latency compensation module 216 compensates the first sensor data based on the time difference and the rate of change. The latency compensation module 216 may receive an extrapolation factor from an extrapolation module 220 and may compensate the first sensor data based on the time difference, the rate of change and the extrapolation factor.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A sensing system comprising:

a sensor configured to:

generate a calibration pulse and first sensor data; and transmit said first sensor data using a variable pulse width; and a control module connected to said sensor and configured to:

receive the first sensor data;

determine a time difference between said calibration pulse and when said sensor data is requested; determine a rate of change of said sensor data based on N prior sensor data samples and said first sensor data samples, where N is an integer greater than zero; and adjust said first sensor data based on said time difference and said rate of change.

2. The sensing system of claim 1 wherein said control module includes an interface and a central processing unit (CPU).

3. The sensing system of claim 2 wherein said interface is configured to generate said time difference.

4. The sensing system of claim 1 wherein said control module is configured to receive an extrapolation factor and to compensate said first sensor data based on said time difference, said rate of change and said extrapolation factor.

5. A vehicle comprising the sensing system of claim 1.

6. A method executed by a sensing system comprising:

generating a calibration pulse and first sensor data using a first sensor;

transmitting said first sensor data using a variable pulse width;

receiving said first sensor data;

determining a time difference between said calibration pulse and when said sensor data is requested;

determining a rate of change of said sensor data based on N prior sensor data samples and said first sensor data samples, where N is an integer greater than zero;

adjusting said first sensor data based on said time difference and said rate of change.

7. The method of claim 6 further comprising:

receiving an extrapolation factor; and compensating said first sensor data based on said time difference, said rate of change and said extrapolation factor.

8. A control system comprising:

an age determining module configured to determine a time difference between a calibration pulse and when said sensor data is requested;

a rate determining module configured to determine a rate of change of said sensor data based on N prior sensor data samples and said first sensor data samples, where N is an integer greater than zero; and a latency compensation module configured to compensate said first sensor data based on said time difference and said rate of change.

9. The control system of claim 8 wherein said latency compensation module is configured to receive an extrapolation factor and to compensate said first sensor data based on said time difference, said rate of change and said extrapolation factor.

10. A vehicle comprising the control system of claim 8.

11. The control system of claim 8 further comprising a calibration pulse detector module is configured to detect said calibration pulse.

12. A sensing system comprising the control system of claim 11 further comprising:

a sensor configured to generate said calibration pulse and said first sensor data and to transmit said first sensor data using a variable pulse width.

* * * * *